3,095,269
CONVERSION OF CALCIUM HYDROGEN PHOSPHATE DIHYDRATE TO THE ANHYDROUS FORM

Vincent Chiola and Clarence D. Vanderpool, Towanda, Pa., assignors to Sylvania Electric Products Inc., a corporation of Delaware
No Drawing. Filed Oct. 12, 1960, Ser. No. 62,097
2 Claims. (Cl. 23—109)

This invention relates to a novel method for preparing very highly crystalline, closely-sized, luminescent grade, anhydrous dibasic calcium phosphate, $CaHPO_4$, possessing characteristic form and habit.

Since crystallinity and size of luminescent grade $CaHPO_4$ are reflected in the crystallinity and size of the phosphor manufactured therefrom and ultimately in the performance of the end-product fluorescent lamp, it has been found extremely desirable to control the starting phosphate raw material used in the synthesis of calcium halophosphate phosphors.

The purpose and object of this invention is to provide anhydrous dibasic calcium phosphate for use in phosphors and possessing a high degree of crystallinity, a narrow particle size distribution, uniform crystal size, relatively little agglomeration or aggregation, optimum bulk density and characteristic, plate-like crystals.

Previous practice, used in preparing luminescent grade $CaHPO_4$, was to mix solutions of a calcium salt, generally calcium chloride, with diammonium phosphate (DAP) at temperatures greater than 60° C. The anhydrous $CaHPO_4$ thus precipitated was washed, recovered by filtration and dried in the usual manner. An alternative practice was to mix DAP and calcium chloride solution at temperatures ranging from room temperature to 65° C., to precipitate calcium hydrogen phosphate dihydrate ($CaHPO_4 \cdot 2H_2O$). After separation from its mother liquor the dihydrate was converted (dehydrated) to anhydrous material by normal drying methods.

Products prepared by the prior method of mixing hot solutions of DAP and $CaCl_2$ are generally characterized by poor crystallinity, i.e., many fines, poorly formed crystals (spherulitic growths, etc.), wide particle size distribution, relatively high degree of agglomeration and aggregation, varying bulk density and a three dimensional type of crystal of considerable thickness. This is not the type of calcium hydrogen phosphate which is most desirable for synthesis of calcium halophosphate phosphors, useful in fluorescent lamp manufacture.

The alternative practice of drying the highly crystalline dihydrate to anhydrous $CaHPO_4$ produces a material having many of the same disadvantages. Dehydration of the dihydrate using normal mechanical drying practices usually results in highly agglomerated and aggregated anhydrous $CaHPO_4$. There is, in adidtion, a problem of controlling drying rate to effect gradual release of large quantities of chemically bonded water or water of crystallization. Excessive rate of drying tends to cause degradation of well-formed crystals due to sudden release of the water, resulting in excessive break-up or fracture of dihydrate particles, fines and wide size distribution. Finally, this method has an economic disadvantage because of the necessity for isolating or separating the dihydrate ($CaHPO_4 \cdot 2H_2O$) before conversion (dehydration) to anhydrous $CaHPO_4$.

Control of the calcium hydroxyl apatite (or tricalcium phosphate) content tends to drift away from the optimum as indicated by the nominal mole ratio, $Ca/P=1.03$, in both the usual and alternative practice. It is extremely desirable to have a raw material of Ca/P mole ratio as close as possible to the theoretical mole ratio of 1.00 for $CaHPO_4$. The presence of higher phosphates makes the synthesis of calcium halophosphate phosphors much more critical, as is well known in the art.

We have found that calcium hydrogen phosphate dihydrate ($CaHPO_4 \cdot 2H_2O$) can be converted (dehydrated) to anhydrous $CaHPO_4$ by heating (65–104° C.) in aqueous medium, preferably in its own mother liquor. This is unexpected because crystals would usually become hydrous under such conditions. The anhydrous calcium hydrogen phosphate has a high degree of crystallinity, relatively uniformly-sized particles, narrow particle size distribution range, relatively little agglomeration or aggregation, is essentially pure anhydrous calcium hydrogen phosphate and consists of plate-like crystals.

Diammonium phosphate is added to a solution of calcium salt at temperatures below 65° C. to form crystalline calcium hydrogen phosphate dihydrate ($CaHPO_4 \cdot 2H_2O$). While still at the temperature of precipitation, the pH of the dihydrate slurry is adjusted with mineral acid. The slurry is then heated to boiling to effect conversion (dehydration) of the $CaHPO_4 \cdot 2H_2O$ to anhydrous $CaHPO_4$. Conversion is invariably accompanied by a characteristic drop in pH from the value at which the slurry was initially adjusted to a value in the 2.2–3.6 range, depending on the starting pH.

The dihydrate and the resulting anhydrous product are readily identifiable from X-ray data. The conversion (dehydration) can also be readily followed by microscopic examination of the products at each stage.

Product yields range from 50 to 90% of theoretical yield, based on calcium, depending mainly on the pH to which the dihydrate is adjusted (conversion pH) before boiling.

One advantage of the invention is the improvement in the properties of the dibasic calcium phosphate produced, as explained in the foregoing.

A further advantage is the simplicity, ease and convenience of achieving conversion (dehydration) of dihydrate without separation from mother liquor, eliminating costly and time consuming steps which would normally be involved.

Still another advanatge is the enhanced performance of fluorescent lamps, manufactured with the product of the invention.

There are numerous modifications and variations in methods which can be used without departing from the spirit of the invention. These, however, are mainly in the category of varying conditions for preparing dihydrate. The basic procedure, i.e., converting dihydrate $CaHPO_4 \cdot 2H_2O$ to anhydrous $CaHPO_4$ by heating (65–104° C.) in aqueous medium, preferably mother liquor, is applicable to all such variations.

The sole, critical condition for achieving such conversion (dehydration) of dihydrate ($CaHPO_4 \cdot 2H_2O$ consistently to produce the advantages of the invention is to heat a pH-adjusted dihydrate slurry.

The mixing of boiling solutions of calcium salt and diammonium phosphate (DAP) or mono-ammonium phosphate (MAP), or adding a boiling DAP (or MAP) aqueous solution to a boiling calcium salt solution has been described in a U.S. patent disclosure, Serial No. 827,173, filed July 15, 1959, by Mooney et al. Such methods do not achieve the results of the present invention, for the calcium phosphate precipitated at temperatures greater than 65° C. has been identified as anhydrous calcium hydrogen orthophosphate. The present invention depends on formation of dihydrate and subsequent dehydration.

Variations such as raw materials, temperature of dihydrate precipitation, conversion pH, mineral acid used to adjust pH and heating period may have an effect on crystal habit, crystal size, size distribution, degree of crystallinity, aggregation and/or agglomeration, yield, ease of recovery by filtration, etc., of the final product but do not in any way affect the implementation of the invention to the dihydrate slurry.

Dihydrate ($CaHPO_4 \cdot 2H_2O$) for use as a starting material in our process may be prepared from a calcium salt solution and diammonium phosphate (DAP) as the source of phosphate ion. The source of phosphate ion may also be mono-ammonium phosphate (MAP) or a mixture of a suitable grade phosphoric acid and ammonium hydroxide. DAP and MAP may be added to calcium salt solution as solids or in solution.

The source of calcium may be any of the common salts which are commercially available, depending on economic considerations. Calcium chloride, calcium nitrate, calcium formate, calcium acetate, calcium carbonate (in phosphoric acid) and even limestone (in phosphoric acid) are all satisfactory sources of calcium.

Dibasic calcium phosphate dihydrate, ($CaHPO_4 \cdot 2H_2O$) may be precipitated within the practical range of about 20° C. to 65° C.

Within this range, the temperature is not critical. A preferred and convenient temperature for dihydrate preparation is room temperature 20–30° C.

Prior to conversion (dehydration) by heating, the pH of the dihydrate slurry may be adjusted to any value ranging from 2.5 to 5.5. For practical reasons, i.e., yield, we have established a lower limit of 3.0 but all of the advantages of the invention may be realized when operating within this range. The pH to which dihydrate slurry is adjusted before conversion affects crystal habit, crystal size and yield. Operating at the lower end of the range tends to give diamond-shaped crystals, larger size crystals but lower yield. Operating at the upper end of the range tends to give cubic crystals of smaller size, and increased yield.

The pH of dihydrate slurry may be adjusted before conversion (dehydration) with either hydrochloric acid, nitric acid, phosphoric acid, or mixtures of any two or three of these acids. We prefer to use nitric acid in systems where calcium nitrate is the starting material, hydrochloric acid where calcium chloride is the starting material.

The concentration of calcium in solution may range from 0.1 molar to 3 molar; similarly, the concentration of DAP may be varied over the same range. We prefer to work at concentrations in the range of 0.5 molar.

The dihydrate slurry may be formed from solutions containing a 1:1 mole ratio of calcium to phosphate (stoichiometric). The starting calcium to phosphate ratio in solution may range from 3:1 to 1:3.

After suitably adjusting pH and achieving boiling conditions, boiling may range from a few minutes to four hours. The length of the boiling period depends mainly on concentration and the size of the starting dihydrate crystals.

Embodiments of the invention are illustrated in the following specific examples:

Example 1

43.2 pounds of calcium was dissolved in 140 gallons of deionized water and total volume was adjusted to 160 gallons. 34.8 pounds of DAP solids (commercial diammonium phosphate) was added to the calcium nitrate solution to form calcium hydrogen phosphate dihydrate at room temperatures (25° C.). A volume of 4650 ml. of concentrated hydrochloric acid was added to adjust the pH of the slurry to 3.6. The slurry was heated to boiling; temperature was recorded at 101–103° C. After 5 minutes there occurred a characteristic drop in pH to 2.5–2.6, indicating conversion (dehydration). Conversion was confirmed by microscopic examination. A yield of 16 pounds of dry product was obtained, equivalent to 64.5% of theoretical (24.9 pounds) based on calcium. The product consisted of diamond-shaped, plate-like crystals which were relatively non-agglomerated.

Example 2

314.8 pounds of calcium nitrate was dissolved in 140 gallons of deionized water and total volume was adjusted to 160 gallons. 175.7 pounds of DAP solids was added to the calcium nitrate solution to form dihydrate at room temperature. The dihydrate slurry was adjusted to a pH of 2.9 with 10,000 ml. of reagent $HNO_3$. The slurry was heated to boiling and after one-half hour there occurred a characteristic pH drop to about 2.1, indicating conversion or dehydration. This was confirmed by microscopic examination of the product. A yield of 128 pounds, 70.3% of theoretical (183 pounds) based on calcium was obtained. The product consisted of diamond-shaped, plate-like crystals.

Example 3

48 pounds of purified calcium chloride was dissolved in 140 gallons of deionized water and total volume was adjusted to 160 gallons. 57.3 pounds of DAP solids were added to the calcium chloride solution to form dihydrate at room temperature. The dihydrate slurry was adjusted to a pH of 3.6 with 3,000 ml. of reagent hydrochloric acid. The slurry was heated to boiling and maintained at boiling until there occurred the characteristic pH drop to 2.9, indicating conversion. Total time at boiling was about one hour. Conversion was confirmed by microscopic examination. The product consisted of highly-crystalline, diamond-shaped, plate-like crystals. Yield was 44 pounds equivalent to 74.5% of theoretical (59 pounds) based on calcium.

Example 4

148 pounds of purified $CaCl_2$ was dissolved in 140 gallons of deionized water and total volume was adjusted to 160 gallons. 175.7 pounds of DAP solids were added to the chloride solution at room temperature (25° C.) to form dihydrate. The dihydrate slurry was adjusted at room temperature to a pH of 3.8 with 4,000 ml. of hydrochloric acid. The slurry was heated to a boiling and maintained at boiling until there occurred a characteristic drop in pH of 2.5–2.6, indicating conversion. Total time at boiling was about one hour. Conversion was confirmed by microscopic examination of the product. The product consisted of highly-crystalline, diamond-shaped, plate-like crystals and crystal size tended to be small. Yield was 159 pounds, 87.7% of theoretical (181 pounds) based on calcium.

Example 5

62.8 pounds of calcium nitrate was dissolved in 140 gallons of deionized water and total volume was adjusted to 160 gallons. 69.6 pounds of DAP solids was added to the nitrate solution at room temperature to form dihydrate. The dihydrate slurry was adjusted to a pH of 4.4 with 1100 ml. of nitric acid. The slurry was heated to boiling until there occurred a characteristic drop in pH to 3.5. Total time at boiling was about one hour. Conversion was confirmed by microscopic examination. The product was highly crystalline; crystals were plate-like but had a cubic and sod-like crystal habit. This illustrates change in habit with high conversion pH values. Yield was 32 pounds or 88.6% of theoretical, illustrating a trend to higher yield with higher conversion pH values.

The range of temperatures given for heating in the foregoing examples do not exceed 104° C. However, if the ambient pressure, which will generally be atmospheric, is high, the boiling point of the heated material may be somewhat above 104° C., and the mixture can be heated to the higher boiling point. However, higher pressures than standard atmospheric will not ordinarily be desirable.

What we claim is:

1. A process of converting calcium hydrogen phosphate dihydrate to anhydrous calcium hydrogen phosphate, which process comprises adjusting the pH of the dihydrate in its own mother liquor to a value between about 2.5 to 5.5, by adding acid, then heating the dihydrate in its own mother liquor to a temperature between about 65° C. and its boiling point until the pH drops substantially below its initial value to a value between about 2.2 to 3.6, and recovering the resultant anhydrous phosphate from the remaining mother liquor.

2. A process of converting calcium hydrogen phosphate dihydrate to anhydrous calcium hydrogen phosphate, which process comprises adjusting the pH of the dihydrate in an aqueous medium to a value between about 2.5 to 5.5 by adding acid, then heating the dihydrate in the aqueous medium to a temperature between about 65° C. and its boiling point until the pH drops substantially below its initial value to a value between about 2.2 to 3.6, and recovering the resultant anhydrous phosphate from the aqueous medium.

References Cited in the file of this patent

Van Wazer: Phosphorus and its Compounds, vol. 1, Chemistry, Interscience Publishers, N.Y., 1958, pages 519–522.